United States Patent
Takagi et al.

(10) Patent No.: US 7,182,552 B2
(45) Date of Patent: Feb. 27, 2007

(54) METHOD FOR DELIVERING A FINE PARTICLE DISPERSION, AND DEVICE FOR DELIVERING A FINE PARTICLE DISPERSION

(75) Inventors: Seiichi Takagi, Minamiashigara (JP); Tetsuo Ohta, Minamiashigara (JP)

(73) Assignee: Fuji Xerox Co., Ltd., Tokyo (JP)

( * ) Notice: Subject to any disclaimer, the term of this patent is extended or adjusted under 35 U.S.C. 154(b) by 167 days.

(21) Appl. No.: 10/991,999

(22) Filed: Nov. 19, 2004

(65) Prior Publication Data
US 2005/0249034 A1    Nov. 10, 2005

(30) Foreign Application Priority Data
May 10, 2004  (JP) .............................. 2004-140313

(51) Int. Cl.
*B65G 53/16* (2006.01)
(52) U.S. Cl. ................ 406/86; 406/191; 406/197
(58) Field of Classification Search ................ 406/86, 406/191, 197
See application file for complete search history.

(56) References Cited

U.S. PATENT DOCUMENTS

| | | | |
|---|---|---|---|
| 4,982,097 A * | 1/1991 | Slivon et al. ............... | 250/288 |
| 5,637,469 A * | 6/1997 | Wilding et al. ............. | 435/7.21 |
| 5,716,852 A * | 2/1998 | Yager et al. ................ | 436/172 |
| 6,177,479 B1 * | 1/2001 | Nakajima et al. ............ | 516/73 |
| 6,296,810 B1 * | 10/2001 | Ulmer ....................... | 422/82.07 |
| 6,596,140 B2 * | 7/2003 | Nordman et al. ........... | 204/452 |
| 6,710,874 B2 * | 3/2004 | Mavliev ...................... | 356/336 |
| 6,802,640 B2 * | 10/2004 | Schubert et al. ......... | 366/181.6 |
| 6,835,313 B2 * | 12/2004 | Sando et al. ................ | 210/634 |
| 2002/0057627 A1 | 5/2002 | Schubert et al. | |

FOREIGN PATENT DOCUMENTS

| EP | 1 358 931 A2 | 11/2003 |
|---|---|---|
| JP | A-11-276802 | 10/1999 |
| WO | WO 2005/077505 A2 | 8/2005 |

OTHER PUBLICATIONS

"Kagaku Kougaku"; *Chemical Engineering of Japan;* vol. 66, No. 2; 2002; pp. 62-66 w/ partial translation.

* cited by examiner

*Primary Examiner*—Joe Dillon, Jr.
(74) *Attorney, Agent, or Firm*—Oliff & Berridge, PLC

(57) ABSTRACT

Provided are a method for delivering a fine particle dispersion which makes it possible to flow the fine particle dispersion, as a stable flow, in a microflow-channel without sedimentation, being deposited on the bottom face of the inner surface of the channel or blocking up or clogging the channel, so as to give a high efficiency for recovering the fine particles; and a device for delivering a fine particle dispersion which can be used for a long period of time and which makes it possible to flow the fine particle dispersion as a stable flow in a microflow-channel without sedimentation, being deposited on the bottom face of the inner surfaces of the channel or blocking up or clogging the channel.

20 Claims, 2 Drawing Sheets

GRAVITATIONAL
DIRECTION

GRAVITATIONAL
DIRECTION

METHOD FOR DELIVERING A FINE PARTICLE DISPERSION, AND DEVICE FOR DELIVERING A FINE PARTICLE DISPERSION

CROSS-REFERENCE TO RELATED APPLICATION

This application claims priority under 35 USC 119 from Japanese Patent Application No. 2004-140313, the disclosure of which is incorporated by reference herein.

BACKGROUND OF THE INVENTION

1. Field of the Invention

The present invention relates to a method for delivering a fine particle dispersion and a device for delivering a fine particle dispersion by use of a microflow-channel.

2. Description of the Related Art

In recent years, various research has been made into performing chemical reactions, unit operations or the like at a scale in the order of micrometers. In connection with this, methods and devices have been suggested for extraction, separation, mixing or particle-formation, focussing on the short diffusion times.

Dispersions of fine particles having a specific gravity greater than that of the liquid medium thereof and having a size in the order of microns are ordinarily caused to flow in channels (or pipes) having cross-section diameter in the order of centimeters or more.

However, there has not been suggested any method for causing a dispersion of fine particles having a specific gravity greater than the liquid medium thereof and having a size in the order of microns to flow in channels having an inside diameter in the order of micrometers.

This is based on the following reason: when a dispersion of fine particles having a specific gravity greater than the liquid medium thereof and having a size in the order of microns is caused to flow in channels having an inside diameters in the order of micrometers, problems of fine particles sedimentation causing clogging of flow arise since the specific gravity of the fine particles is larger than that of the medium. In particular, a fluid in a channel having an inside diameter in the order of micrometers is known to flow in the state of laminar flow due to the inside diameter being small. But with laminar flow, there is no stirring inside the fluid and accordingly fine particles which sediment while moving with the flow do not receive any upwards force and are thus deposited on the bottom of the channel. For this reason, the problem of the particles sedimenting occurs in a short period of time. When the microflow-channel becomes blocked up, it is very difficult to free the blockage resulting in a more serious problem.

Hitherto, it has been considered that the effect of gravitation on fine particles in a channel having an inside diameter in the order of micrometers becomes relatively small (see, for example, "Kagaku Kogaku (Chemical Engineering)" vol. 66 No. 2 (2002)). However, it has been found that dispersed fine particles in the order of microns sedimenting under gravitation cause problems. This is because condition of the channel relative to the gravitational direction is not ordinarily considered.

In cases where a dispersion of fine particles in the order of microns is caused to flow in a channel having an inside diameter in the order of centimeters or more, rarely are fine particles sedimented so as to be deposited on the bottom of the channel. This can be considered as follows: the sedimentation of the fine particles should theoretically occur; however, since the fluid in the channel flows in a turbulent flow state stirring occurs. This means that practically fine particles do not sediment so no deposition of the particles on the bottom face of the channel occurs.

As the above-mentioned methods for performing chemical reactions, unit operations or the like at a micrometer-scale, for example, a solvent-extracting method using a micro-fluid-system is suggested (see, for example, Japanese Patent Application Laid-Open (JP-A) No. 2002-361002). However, this is not a method for use in a system which contains fine particles.

The following methods are also provided: a method of forming mono-dispersed metal nanometer particles continuously; a method of growing crystal by use of the above nanometer particles as nuclei; and a method of performing desaltion or removal of decomposition products continuously from a colloidal dispersion of nanometer particles. However, the size of the metal nanometer particles is described as 10 nm or less, and particles larger than this size are never referred to (see, for example, JP-A No. 2003-193119).

Also suggested is a new method of using a micro-mixer to produce morphologically uniform micrometer particles and nanometer particles continuously, and the use of this method for encapsulating active substances, and particles produced by this method. However, the size of the produced micrometer particles is from about 1 to about 1000 μm (about 10 μm in the working examples). In cases where a dispersion containing particles having a larger specific gravity than that of the liquid medium thereof are delivered in a microflow-channel, sedimentation or the like occurs within the channel causing the flow to be hindered or the channel to be blocked up (see, for example, Japanese Patent Application National Publication (Laid-Open) No. 2003-500202).

In short, no method for delivering a dispersion of fine particles of the order of microns stably and without blocking up the dispersion-delivering channel has been suggested. A method of synthesizing fine particles and delivering a liquid in a microflow-channel, wherein fine particles are dispersed, for example, has been carried out. However, the size of the fine particles is limited to a size in the order of nanometers. In methods for producing particles, or the like, of the order of microns by use of a microreactor, the particles are discharged from the system immediately after the particles are produced. Thus, no method wherein a liquid containing the particles is delivered in the microflow-channel has been suggested.

As described above, hitherto, no method or device has been suggested which: causes no sedimentation or blocking; is capable of delivering fine particles of the order of microns stably; and also, is capable of performing effective washing.

SUMMARY OF THE INVENTION

The present invention has been developed in the light of the need to provide: a method for delivering a fine particle dispersion in a microflow-channel, as a stable flow, without sedimenting, being deposited on the bottom face of the inner surface of the channel or blocking up, or occluding the channel, so as to give a high efficiency for recovering the fine particles; and a device for delivering a fine particle dispersion which can be used for a long period of time and which makes it possible to deliver, as a stable flow, the fine particle dispersion in the microflow-channel without sedimenting, being deposited on the bottom face of the channel or blocking up or occluding the channel.

A first aspect of the invention is to provide a method for delivering a fine particle dispersion comprising: arranging a microflow-channel such that a discharge section is positioned below an inlet section in a gravitational direction; setting the angle of the microflow-channel extending from the inlet section to the discharge section relative to the gravitational direction within the range of about 0 to about 45°; and introducing a fine particle dispersion into the inlet section and delivering the introduced fine particle dispersion to the discharge section in a laminar flow state; wherein the fine particle dispersion comprises fine particles which are dispersed in a liquid medium, the fine particles having a volume-average particle size of about 0.1 to about 1000 µm and a specific gravity of the fine particles is about 1.01 to about 21.00 times that of the liquid medium.

A second aspect of the invention is to provide a method for delivering a fine particle dispersion comprising: using a microflow-channel comprising an inlet section, a discharge section, and comprising at least one of a portion at which the cross-sectional diameter of the channel changes and a portion at which the cross-sectional shape of the channel changes; arranging the microflow-channel such that the discharge section is positioned below the inlet section in the gravitational direction; setting an angle of the wall surfaces of the channel extending from the inlet section to the discharge section relative to the gravitational direction is set within the range of about 0 to about 45°; and introducing the fine particle dispersion into the inlet section and delivering the introduced fine particle dispersion to the discharge section; wherein the fine particle dispersion comprises fine particles which are dispersed in a liquid medium, the fine particles having a volume-average particle size of about 0.1 to about 1000 µm and a specific gravity of the fine particles is about 1.01 to about 21.00 times that of the liquid medium.

A third aspect of the invention is to provide a device for delivering a fine particle dispersion comprising: a microflow channel having an inlet section and a discharge section; wherein the microflow-channel is arranged such that the discharge section is positioned below the inlet section in the gravitational direction; and an angle of the channel extending from the inlet section to the discharge section to the gravitational direction is set within the range of about 0 to about 45°; wherein the fine particle dispersion comprises fine particles which are dispersed in a liquid medium, the fine particles having a volume-average particle size of about 0.1 to about 1000 µm and a specific gravity of the fine particles is about 1.01 to about 21.00 times that of the liquid medium, and the fine particle dispersion is delivered from an inlet section to a discharge section in a laminar flow state.

A fourth aspect of the invention is to provide a device for delivering a fine particle dispersion comprising: a microflow-channel having an inlet section; a discharge section; and at least one of a portion at which the cross-sectional diameter of the channel changes and a portion at which the cross-sectional shape of the channel changes, wherein the microflow-channel is arranged such that the discharge section is positioned below the inlet section in the gravitational direction, and an angle of the wall surfaces of the channel extending from the inlet section to the discharge section relative to the gravitational direction is set within the range of about 0 to about 45°, wherein the fine particle dispersion comprises fine particles which are dispersed in a liquid, the fine particles having a volume-average particle size of about 0.1 to about 1000 mm and a specific gravity of the fine particles is about 1.01 to about 21.00 times that of the liquid medium, and the fine particle dispersion is delivered from an inlet section to a discharge section in a laminar flow state.

DETAILED DESCRIPTION OF THE INVENTION

Figure 1:
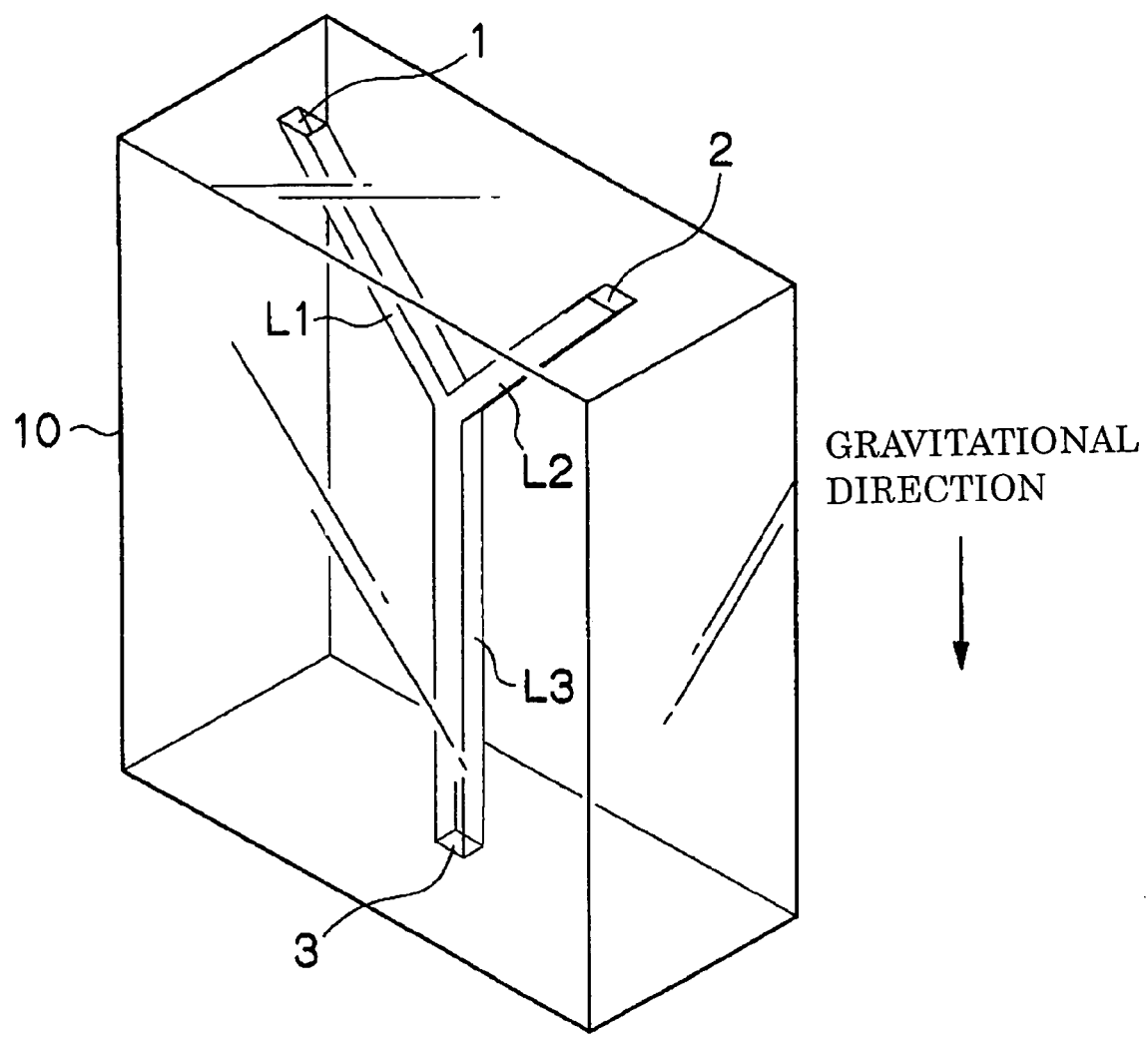
FIG. 1 is a schematic view for explaining a microreactor used in Example 1.

The present invention is described in detail hereinafter.

A first method for delivering a fine particle dispersion according to the invention (hereinafter referred to as "the first dispersion-delivering method of the invention" as the case may be) is a method for delivering a fine particle dispersion wherein fine particles having a volume-average particle size of about 0.1 to about 1000 µm are dispersed in a liquid medium and the specific gravity of the fine particles is about 1.01 to about 21.00 times that of the liquid medium, wherein a microflow-channel comprising an inlet section and a discharge section is used, the fine particle dispersion is delivered in a laminar flow state from the inlet section to the discharge section, the microflow-channel is arranged so that the discharge section is positioned below the inlet section in the gravitational direction, the angle of the channel extending from the inlet section to the discharge section to the gravitational direction is set within the range of about 0 to about 45°, and the fine particle dispersion is introduced into the inlet section and the introduced fine particle dispersion is delivered to the discharge section.

A second method for delivering a fine particle dispersion according to the invention (hereinafter referred to as "the second dispersion-delivering method of the invention" as the case may be) is a method for delivering a fine particle dispersion wherein fine particles having a volume-average particle size of about 0.1 to about 1000 µm are dispersed in a liquid medium and the specific gravity of the fine particles is about 1.01 to about 21.00 times that of the liquid medium, wherein a microflow-channel comprising an inlet section and a discharge section and comprising a portion at which the cross-sectional diameter of the channel changes and/or a portion at which the shape of the channel changes is used, the fine particle dispersion is delivered in a laminar flow state from the inlet section to the discharge section, the microflow-channel is arranged so that the discharge section is positioned below the inlet section in the gravitational direction, the angle of the wall surfaces of the channel extending from the inlet section to the discharge section to the gravitational direction is set within the range of about 0 to about 45°, and the fine particle dispersion is introduced into the inlet section and the introduced fine particle dispersion is delivered to the discharge section.

In the invention, the volume-average particle size of the fine particles is a value measured with a Coulter counter TA-II model (manufactured by Beckman Coulter, Inc.) except when the fine particles have a particle size of 5 µm or less. The volume-average particle size is measured by use of an optimal aperture depending on the particle size level of the fine particles. However, in cases where the fine particles have a particle size of 5 µm or less, the volume-average particle size is measured with a laser scattering particle size distribution measuring device (trade name: LA-700, manufactured by Horiba Ltd.). Also, when the particle size is of the order of nanometers, the volume-average particle size is measured with a BET type specific surface area measuring device (trade name: Flow Sorb II2300, manufactured by Shimadzu Corp.).

The specific gravity of the fine particles is measured with a pycnometer (trade name: Ultrapycnometer 1000, manufactured by Yuasa Ionics Co., Ltd.) by gas phase displacement method (pycnometer method).

The specific gravity of the liquid medium is measured with a density determination kit (trade name: AD-1653 manufactured by A & D Co., Ltd.).

The fine particle dispersion used in the first and second dispersion-delivering methods of the invention, which may also be referred to below as "the dispersion-delivering method of the invention", is a dispersion wherein: fine particles having a volume-average particle size of about 0.1 to about 1000 μm are dispersed in a liquid medium; and, the specific gravity of the fine particles is about 1.01 to about 21.00 times that of the liquid medium.

The fine particles are not particularly limited as long as the volume-average particle size thereof is from about 0.1 to about 1000 μm. The fine particles may be selected from resin fine particles, inorganic fine particles, metal fine particles, ceramic fine particles, and other like particles.

The volume-average particle size of the fine particles is required to be from about 0.1 to about 1000 μm, as described above, and is preferably from about 0.1 to about 500 μm, more preferably from about 0.1 to about 200 μm, even more preferably from about 0.1 to about 50 μm. If the volume-average particle size of the fine particles is more than 1000 μm, the fine particles in the fine particle dispersion delivered in the microflow-channel used in the invention may cause the channel to block up since the diameter of the microflow-channel is from several micrometers to several thousands of micrometers as described later. On the other hand, if the volume-average particle size of the fine particles is less than 0.1 μm, the problem of fine particles being deposited hardly arrises but the influence of the interaction between the particles and the inner wall surface increases resulting in problems such as the adhesion of the particles onto the inner wall surface.

The shape of the fine particles is not particularly limited. However, if the fine particles are of a needle form, and in particular if the long axis thereof becomes larger than ¼ of the width of the channel, the possibility that the channel get blocked becomes high. From this perspective, the ratio of the long axis length of the fine particles to the short axis length thereof (that is, the long axis length/the short axis length) is preferably from 1 to 50, and more preferably from 1 to 20. It is desired to select the channel width appropriately in accordance with the particle size and the particle shape.

The kind of the fine particles may be any one of the types listed in the following examples: organic and inorganic crystals or aggregates, such as polymer particles or pigment particles; metal fine particles; metal compound fine particles such as metal oxide, metal sulfide and metal nitride fine particles; and ceramic fine particles. However, the fine particles are not limited to these types.

Specific examples of the polymer fine particles include fine particles made of the following: polyvinyl butyral resin, polyvinyl acetal resin, polyarylate resin, polycarbonate resin, polyester resin, phenoxy resin, polyvinyl chloride resin, polyvinylidene chloride resin, polyvinyl acetate resin, polystyrene resin, acrylic resin, methacrylic resin, polyacrylamide resin, polyamide resin, polyvinyl pyridine resin, cellulose-based resin, polyurethane resin, epoxy resin, silicone resin, polyvinyl alcohol resin, casein, vinylchloride/vinyl acetate copolymer, modified vinyl chloride/vinyl acetate copolymer, vinyl chloride/vinyl acetate/maleic anhydride copolymer, styrene/butadiene copolymer, vinylidene chloride/acrylonitrile copolymer, styrene/alkyd resin, and phenol/formaldehyde resin, and the like.

Examples of the metal or metal compound fine particles include fine particles made of the following: a metal such as zinc, aluminum, copper, iron, nickel, chromium or titanium and the like, or alloys thereof; metal oxides such as $TiO_2$, $SnO_2$, $Sb_2O_3$, $In_2O_3$, ZnO, MgO or iron oxide and the like, or any compound thereof; metal nitrides such as silicon nitride and the like; and any combination thereof.

Various processes for producing these fine particles may be used. In many cases, it is a process of producing by synthesis directly within a medium, and using without modification: Also fine particles may be produced in a process by crushing a lump mechanically, and then dispersing in a medium. In this process in many cases, the lump is crushed in the medium and the resultant is used directly.

In cases where powder is produced in a dry process (fine particles), it is necessary to disperse the powder in a medium before using. The method for dispersing the dry powder in the medium may be a method using a sand mill, a colloid mill, an attritor, a ball mill, a Dyno mill, high-pressure homogenizer, an ultrasonic disperser, a co-ball mill, a roll mill or the like. At this time, it is preferable to perform the method under conditions where the primary particles are not pulverized by the dispersion process.

The specific gravity of the fine particles is required to be about 1.01 to about 21.00 times that of the liquid medium, preferably about 1.05 to about 12.00 times, more preferably about 1.05 to about 5.00 times. If the specific gravity of the fine particles is less than 1.01 times that of the liquid medium, the fine particles are not easily delivered since the fine particles float to the surface of the liquid medium. On the other hand, if the specific gravity of the fine particles is more than 21.00 times that of the liquid medium, the fine particles precipitate greatly so that the fine particles are not easily delivered.

The liquid medium is not particularly limited as long as the specific gravity of the fine particles can be set within the range of about 1.01 to about 21.00 times that of the liquid medium as mentioned above. Examples thereof include water, aqueous media, organic solvent type media and the like.

The water may be ion exchange water, distilled water, electrolytic ion water, or the like. Specific examples of the organic solvent type media include methanol, ethanol, n-propanol, n-butanol, benzyl alcohol, methylcellosolve, ethylcellosolve, acetone, methyl ethyl ketone, cyclohexanone, methyl acetate, n-butyl acetate, dioxane, tetrahydrofuran, methylene chloride, chloroform, chlorobenzene, toluene, xylene, and the like and mixtures of two or more thereof.

The preferred example of the liquid medium varies depending on the type of the fine particles. Preferred examples of the liquid medium depending on the kind of the fine particles are as follows. Preferred examples of the liquid medium for combining with polymer fine particles (the specific gravity thereof being generally from about 1.05 to 1.6) include aqueous solvents, organic solvents (such as alcohols, xylene and the like), acidic or alkaline waters, and the like which do not dissolve the fine particles.

Preferred examples of the liquid media for combining with the metal or metal compound fine particles (the specific gravity thereof being generally from about 2 to 10) include water, organic solvents (such as alcohols, xylene, and the like), and oils which do not oxidize, reduce, or otherwise react with the metal.

In the dispersion-delivering device of the invention, more preferred examples of combinations of fine particles with liquid media include a combination of polymer fine particles with an aqueous medium, and a combination of a metal or metal compound with a low-viscosity oily medium. Particularly preferable is the combination of polymer fine particles with an aqueous medium.

The content by percentage of the fine particles in the fine particle dispersion is preferably from about 0.1 to 60% by volume, more preferably from about 5 to about 30% by volume. If the content by percentage of the fine particles in the fine particle dispersion is less than 0.1% by volume, problems result during recovery of the fine particles. If the content by percentage is more than 60% by volume, the possibility that the particles block the channel increases.

The microflow-channel used in the invention is a channel comprising an inlet section and a discharge section and with a channel width in the order of micrometers, specifically a channel having a width from several micrometers to several thousands of micrometers. This microflow-channel is preferably a microreactor as described below.

The following describes the dispersion-delivering method of the invention, and the device of the invention for delivering a fine particle dispersion by use of a microflow-channel, giving as an example a case in which a microreactor is used as the microflow-channel.

The microreactor used in the invention is a reactor having one or more channels on a micrometer scale, and the number of the channels is preferably two or more. Since each of the channels of the microreactor is on a micrometer scale, both the dimensions and the flow rate thereof are small, and the Reynolds number thereof is several hundreds or less. Accordingly, when a liquid is delivered in the microreactor used in the invention, the liquid is delivered in a laminar flow state.

The Reynolds number (Re) is represented by the equation: Re=uL/v, wherein u represents the flow rate, L represents the characteristic length, and v represents the kinematic viscosity coefficient. When this value is about 2300 or less, laminar flow is predominant.

The material of the microreactor used in the invention may be a material in generally use, such as metal, ceramic, plastic or glass or the like. It is preferable that the material is appropriately selected depending on the liquid medium to be delivered.

In the first dispersion-delivering method of the invention, the microreactor is arranged so that its discharge section is positioned below its inlet section in the gravitational direction, and the angle of the channel extending from the inlet section to the discharge section relative to the gravitational direction is set within the range of about 0 to about 45°. In this context, the angle of the channel relative to the gravitational direction means the angle made between the gravitational direction and a line connecting the centers of gravity obtained when each section of the channel is cut into cross sections.

The angle of the channel to the gravitational direction is preferably from about 0 to 30°, more preferably from about 0 to about 15°, even more preferably from about 0 to about 10°, most preferably from about 0 to about 5°. If the angle of the channel to the gravitational direction is more than 45°, the fine particles sediment so as to adhere or deposit on the bottom face of the inner surface of the channel, thereby causing blocking of the channel.

In the second dispersion-delivering method of the invention, the microreactor is arranged so that its discharge section is positioned below its inlet section in the gravitational direction, and has: a portion at which the cross-sectional diameter of the channel changes; and/or, a portion at which the cross-sectional shape of the channel changes; and further the angle of the wall surfaces of the channel extending from the inlet section to the discharge section relative to the gravitational direction is set within the range of about 0 to about 45°.

The angle of the wall surface of the channel relative to the gravitational direction is preferably from about 0 to about 30°, more preferably from about 0 to about 15°, even more preferably from about 0 to about 100, most preferably from about 0 to about 5°. If the angle of the wall surfaces of the channel to the gravitational direction is more than 45°, the fine particles sediment so as to be adhered or deposited on the bottom face of the inner surface of the channel, thereby causing blocking of the channel.

In cases where the microreactor in the first dispersion-delivering method of the invention has a portion at which the cross-sectional diameter of its channel changes and/or a portion at which the cross-sectional shape of the channel changes, the angle of the surface wall of the portion wherein the cross-sectional diameter of the channel changes, and/or the portion wherein the cross-sectional shape of the channel changes relative to the gravitational direction is preferably from about 0 to 45°, more preferably from about 0 to about 30°, even more preferably from about 0 to about 15°, even more preferably from about 0 to about 10°, most preferably from about 0 to about 5°.

The deposition of fine particles in microflow-channels can be prevented or overcome merely by making the directions of the channels equal to the gravitational direction. However, it is impossible to make the directions of all channels in a microreactor equal to the gravitational direction. Thus, the relationship between the inclination of a channel and the degree of sedimentation of fine particles has been investigated fully. As a result, it has been found that when the angle of a channel, or the wall surface of a channel relative to the gravitational direction is made at least within the range of about 0 about 45°, the sedimentation of particles therein does not become a significant problem. Thus, when the above-mentioned fine particle dispersion is introduced into the above-mentioned inlet section, the fine particle dispersion can be delivered, as a stable flow, to the discharge section by gravitation, and then recovered at a high recovering efficiency without the sedimentation of the fine particles or the deposition thereof on the bottom face of the inner surface of the channel and without causing blocking or clogging up of the channel.

The dispersion-delivering method of the invention is preferably used to wash fine particles. In order to wash fine particles, a method wherein batch-process filtration combined with re-dispersion is generally adopted. Therefore, due to the fact that particles are transferred between process steps and some fine particles remain on the filter, efficiency is poor. By applying the dispersion-delivering method of the invention, which overcomes the problem of sedimentation, to the washing process, the efficiency can be improved.

A first device for delivering a fine particle dispersion according to the invention (hereinafter referred to as "the first dispersion-delivering device of the invention" as the case may be) is a device for delivering a fine particle dispersion wherein fine particles having a volume-average particle size of about 0.1 to about 1000 µm are dispersed in a liquid medium and the specific gravity of the fine particles is about 1.01 to about 21.00 times that of the liquid medium, the device comprising a microflow-channel comprising an inlet section and a discharge section, and the fine particle dispersion being delivered in a laminar flow state from the inlet section to the discharge section, wherein the microflow-channel is arranged so that the discharge section is positioned below the inlet section in the gravitational direction, and the angle of the channel extending from the inlet section to the discharge section to the gravitational direction is set within the range of about 0 to about 45°.

A second device for delivering a fine particle dispersion according to the invention (hereinafter referred to as "the second dispersion-delivering device of the invention" as the case may be) is a device for delivering a fine particle dispersion wherein fine particles having a volume-average particle size of about 0.1 to about 1000 µm are dispersed in a liquid medium and the specific gravity of the fine particles is about 1.01 to about 21.00 times that of the liquid medium, the device comprising a microflow-channel comprising an inlet section and a discharge section and comprising a portion at which the cross-sectional diameter of the channel changes and/or a portion at which the cross-sectional shape of the channel changes, and the fine particle dispersion being delivered in a laminar flow state from the inlet section to the discharge section, wherein the microflow-channel is arranged so that the discharge section is positioned below the inlet section in the gravitational direction, and the angle of the wall surfaces of the channel extending from the inlet section to the discharge section to the gravitational direction is set within the range of about 0 to about 45°.

The fine particle dispersion and the microflow-channel in the first and second dispersion-delivering devices of the invention, which may be referred to below "the dispersion-delivering device of the invention", are the same as the fine particle dispersion and the microflow-channel in the dispersion-delivering method of the invention, respectively. Preferable examples thereof are also the same.

The angle of the channel in the dispersion-delivering device of the invention relative to the gravitational direction and the angle of the wall surfaces of the channel therein relative to the gravitational direction are the same as the respective angles of the dispersion-delivering method. Preferable values thereof are also the same.

Simply by using the dispersion-delivering device of the invention and inlet the fine particle dispersion into the inlet section, the fine particle dispersion can be delivered, as a stable flow, to the discharge section by gravitation. The fine particles can then be recovered at a high recovering efficiency without the sedimentation of the fine particles or the deposition thereof onto the bottom face of the inner surface of the channel and without causing blocking or clogging up of the channel.

The dispersion-delivering device of the invention is preferably used to wash fine particles. In order to wash fine particles, a method wherein batch-process filtration combined with re-dispersion is generally adopted. Therefore, due to the fact that particles are transferred between process steps and some fine particles remain on the filter, efficiency is poor. By applying the dispersion-delivering device of the invention, which overcomes the problem of sedimentation, to the washing process, the efficiency can be improved. Additionally, the dispersion-delivering device of the invention can be used for a long period of time.

EXAMPLES

The present invention is more specifically described by way of the following examples. However, the invention is not limited by the examples.

First, methods for measuring various properties in the following working examples and comparative examples are described.

The volume-average particle size of fine particles is a value measured with a Coulter counter TA-II model (manufactured by Beckman Coulter, Inc.) except when the fine particles have a particle size of 5 µm or less. The volume-average particle size is measured by use of an optimal aperture depending on the particle size level of the fine particles. However, in cases where the fine particles have a particle size of about 5 µm or less, the volume-average particle size is measured with a laser scattering particle size distribution measuring device (trade name: LA-700, manufactured by Horiba Ltd.). Also when the particle size is of the order of nanometers, the volume-average particle size is measured with a BET type specific surface area measuring device (trade name: Flow Sorb II2300, manufactured by Shimadzu Corp.).

The specific gravity of fine particles is measured with a pycnometer (trade name: Ultrapycnometer 1000, manufactured by Yuasa Ionics Co., Ltd.) by gas phase displacement method (pycnometer method).

The specific gravity of any liquid medium is measured with a density determination kit (trade name: AD-1653) manufactured by A & D Co., Ltd.

Example 1

Example 1 is described with reference to FIG. 1. FIG. 1 is a schematic view for explaining a microreactor used in Example 1. In FIG. 1, the microreactor 10 is made of glass, and channels L1, L2 and L3 are provided in the microreactor 10. In the channels L1, L2 and L3, inlet ports 1 and 2 and a discharging port 3 are provided, respectively. The cross-sections of each of the portions is rectangular and the height thereof is 100 µm. The width of each of the channels L1 and L2 is 250 µm, and the length thereof is 20 mm. The width of the channel L3 is 500 µm and the length thereof is 50 mm. The angles of the channels L1 and L2 relative to the gravitational direction are each 45°, and the angle of the channel L3 thereto is 0°.

The following liquid dispersion A and the following liquid dispersion B are introduced into the inlet ports 1 and 2, respectively, by inlet devices (not illustrated).

The dispersion A is an aqueous dispersion containing 5% by volume polystyrene fine particles, having a volume-average particle size of 10 µm (trade name: Standard size particles 4210A, manufactured by MORITEX Corporation). The specific gravity of the polystyrene fine particles is 1.05 times that of water.

The dispersion B is a dispersion in ethanol containing 8% by volume polymethyl methacrylate fine particles having a volume-average particle size of 3 µm. The specific gravity of the polymethyl methacrylate fine particles is 1.50 times that of ethanol.

The dispersions A and B introduced into the inlet ports 1 and 2 respectively, descend toward the discharging port 3 to enter the channel L3, and are discharged from the discharging port 3 so as to be collected. The flow rate of the dispersion A and that of the dispersion B are equal to each other, and are each 0.1 mL/hr. For a period of 5 hours, the dispersions A and B are introduced into the inlet ports 1 and 2, respectively. Whilst being delivered for a 5 hour period the dispersion delivering flows are stable without either adhesion of the polystyrene fine particles and the polymethyl methacrylate fine particles to the wall surfaces or blocking of the channels.

Example 2

A microreactor having the same structure as the microreactor used in Example 1 is used except that the depth of each of the channels L1, L2 and L3 is 200 µm, the widths of the channels L1 and L2 are each 400 µm and the width of the channel L3 is 800 µm. The dispersion A is changed to water, and the dispersion B is changed to a dispersion C as described below. Apart from the above changes, in the same way as in Example 1, water and the dispersion C are introduced into the inlet ports 1 and 2 respectively, so as to be delivered over a 5 hour period. The water and the dispersion C delivering flows are stable without either adhesion of the polystyrene fine particles onto the wall surfaces or blocking of the channels.

The dispersion C is an aqueous dispersion containing 5% by volume polystyrene fine particles having a volume-average particle size of 50 µm (trade name: Standard size particles 4250A, manufactured by MORITEX Corporation). The specific gravity of the polystyrene fine particles is 1.05 times that of water.

Example 3

A dispersion D, as described below, and the dispersion B are introduced into the inlet ports 1 and 2, respectively, in the same way as in Example 1 except for the substation of dispersion A with dispersion D. Over 5 hour period of the dispersions are delivered and the delivering flows stable, without either adhesion of the polystyrene fine particles onto the wall surfaces or blocking of the channels.

The dispersion D is an aqueous dispersion containing 10% by volume of polystyrene fine particles having a volume-average particle size of 0.1 µm (trade name: Standard size particles 5010A, manufactured by MORITEX Corporation). The specific gravity of the polystyrene fine particles is 1.05 times that of water.

Comparative Example 1

A microreactor having the same structure as the microreactor used in Example 1 except that the angle of each of the channels L1 and L2 to the gravitational direction is 60° is used to introduce the dispersions A and dispersion B into the inlet ports 1 and 2, respectively, in the same way as in Example 1. As a result, deposition of the fine particles on the bottom face of the inner surface of the channel L1 becomes conspicuous in about 20 minutes. After 60 minutes, the dispersion is not sufficiently being delivered in the channel L1. Similarly, with regard to the channel L2, deposition of the fine particles becomes conspicuous in about 30 minutes and after 90 minutes the dispersion begins not to flow easily.

Comparative Example 2

A microreactor having the same structure as the microreactor used in Example 1 except that the angle of each of the channels L1 and L2 to the gravitational direction is 50° is used to introduce the dispersions A and dispersion B into the inlet ports 1 and 2, respectively, in the same way as in Example 1. As a result, the deposition of the fine particles on the bottom face of the inner surface of the channel L1 becomes conspicuous in about 40 minutes. After 90 minutes, the dispersion is not sufficiently delivered in the channel L1. Similarly, with regard to the channel L2, the deposition of the fine particles becomes conspicuous in about 60 minutes and after 120 minutes, the channel L2 tends to be blocked up.

Example 4

Figure 2:
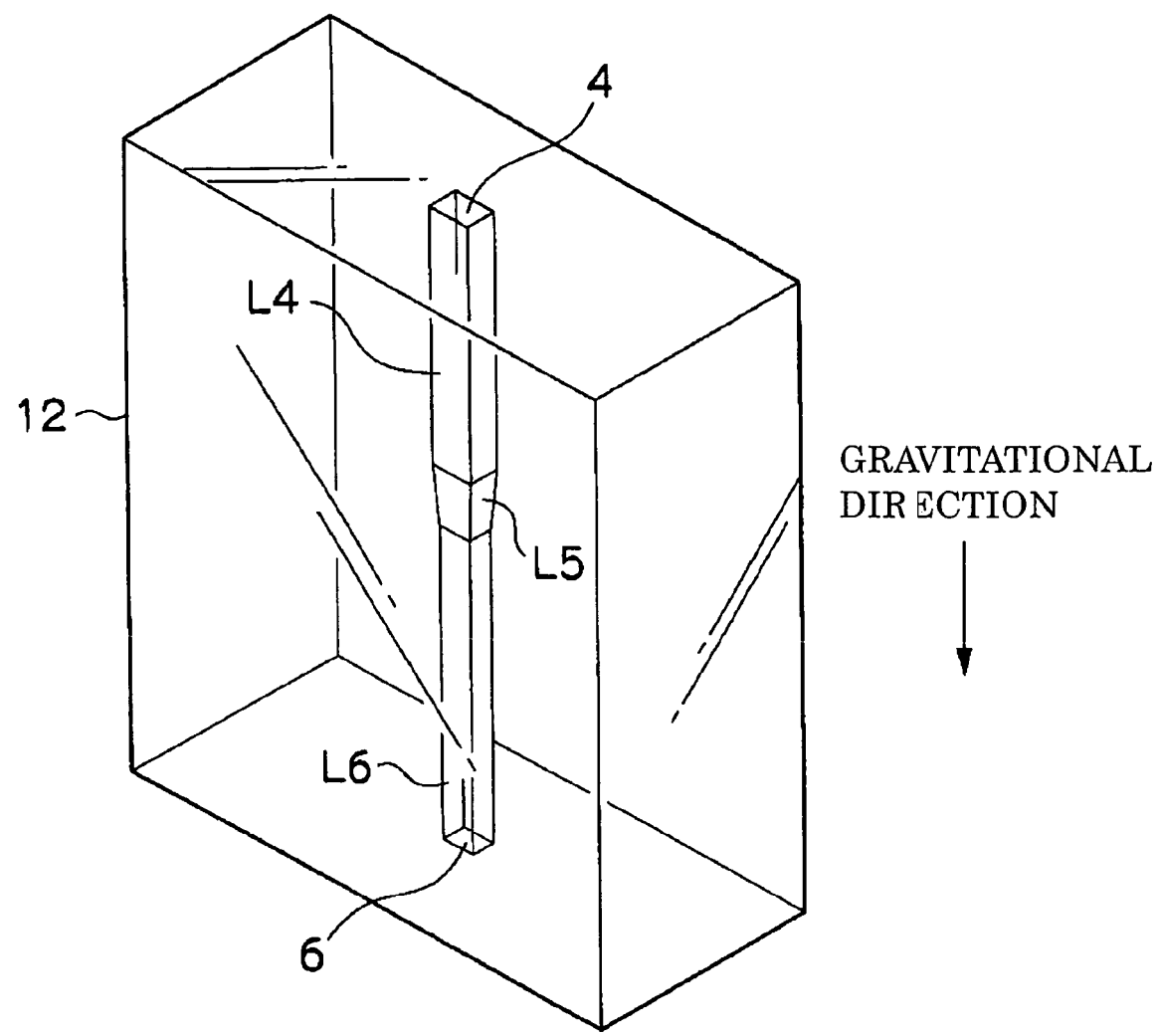
FIG. 2 is a schematic view for explaining a microreactor used in Example 4.

Example 4 is described with reference to FIG. 2. FIG. 2 is a schematic view for explaining a microreactor used in Example 4. In FIG. 2, the microreactor 12 is made of an acrylic resin, and channels L4 and L6 and a connecting channel L5 are provided in the microreactor 12. The channels L4 and L6 and the connecting channel L5 each have a rectangular cross section, and have lengths of 30 mm, 30 mm and 0.26 mm, respectively. The depth of each of the channels is 50 µm. Inlet ports 4 and 6 are provided in the channels L4 and L6, respectively. The channels L4 and L6 have widths of 500 µm and 200 µm, respectively. The angle of the wall surface of each of the channels L4 and L6 to the gravitational direction is 0°. The channel L5 is a channel for connecting the channels L4 and L6 to each other. The angle of the sloping wall surfaces of the channel L5 to the gravitational direction is 30°.

A dispersion E as described below is introduced into the inlet port 4 through an inlet device which is not illustrated.

The dispersion E is an ethanol dispersion containing 10% by volume $TiO_2$ fine particles having a volume-average particle size of 0.4 µm (trade name: KRONOS KA-15, manufactured by Titan Kogyo Kabushiki Kaisha). The specific gravity of the $TiO_2$ fine particles is 4.92 times that of ethanol.

The dispersion E introduced into the inlet port 4 is delivered toward the discharging port 6 by applying pressure giving a flow rate of 1 ml/hr. For a period of 3 hours, the dispersion E is introduced into the inlet port 4 so as to be delivered and the dispersion flow is stable without adhesion of the $TiO_2$ fine particles onto the wall surfaces or blocking of the channels.

Example 5

The dispersion E in Example 4 is substituted with the following dispersion F: an aqueous dispersion containing 5% by volume sieved stainless steel balls (stainless steel fine particles having a particle size of about 50 µm) (trade name: Standard size particles 435, manufactured by MORITEX Corporation). The specific gravity of the stainless steel balls is about 8 times that of water. A microreactor having the same structure as the microreactor used in Example 4 is used except that the depths of the channels L4, L5 and L6 are each 500 µm, the widths of the channels L4 and L6 are 1000 µm and 400 µm respectively, and the lengths of the channels L4, L5 and L6 are 30 mm, 0.52 mm and 30 mm, respectively. The flow rate is changed to 10 ml/hr. For a period of 3 hours the dispersion F is introduced into the inlet port 4 in the same way as in Example 4, so as to be delivered and the dispersion flow is stable without adhesion of the stainless steel balls to the wall surfaces or blocking of the channels.

Comparative Example 3

A microreactor having the same structure as the microreactor used in Example 4, except that an angle of the connecting channel L5 relative to the gravitational direction of 90° is used. The dispersion E is introduced into the inlet port 4 in the same way as in Example 4. As a result, the deposition of the $TiO_2$ fine particles on the wall surface of the connecting channel L5 becomes conspicuous in about 10 minutes and the channel L5 is blocked up in about 30 minutes.

Comparative Example 4

A microreactor having the same structure as the microreactor used in Example 4, except that an angle of the connecting channel L5 relative to the gravitational direction of 50° is used. The dispersion E is introduced into the inlet port 4 in the same way as in Example 4. As a result, the deposition of the TiO$_2$ fine particles on the wall face of the connecting channel L5 becomes conspicuous in about 30 minutes and the channel L5 tends to become blocked up in about 1 hour.

As described above, according to the invention, it is possible to provide: a method for delivering a fine particle dispersion in a microflow-channel, as a stable flow, without sedimenting, being deposited on the bottom face of the inner-surface of the channel or blocking up or occluding the channel, so as to give a high efficiency for recovering the fine particles; and a device for delivering a fine particle dispersion in a microflow-channel which can be used for a long period of time and which makes it possible to deliver, as a stable flow, the fine particle dispersion in the microflow-channel without sedimenting, being deposited on the bottom face of the inner surface of the channel or blocking up or occluding the channel, so as to give a high efficiency for recovering the fine particles.

What is claimed is:

1. A method for delivering a fine particle dispersion to minimize stagnation, deposition or clogging comprising:
    arranging a microflow-channel such that a discharge section is positioned below an inlet section in a gravitational direction;
    setting an angle of the microflow-channel extending from the inlet section to the discharge section within a range of 0° to 45° relative to the gravitational direction;
    introducing a fine particle dispersion into the inlet secton; and
    delivering the introduced fine particle dispersion to the discharge section by a liquid medium in a laminar flow state;
    wherein the fine particle dispersion comprises fine particles which are dispersed in the liquid medium, the fine particles having a volume-average particle size within a range of 0.1 to 1000 µm and a specific gravity of the fine particles within a range of 1.01 to 21.00 times that of the liquid medium such that stagnation, deposition or clogging is minimized.

2. The method of claim 1, wherein the fine particles are selected from resin fine particles, inorganic fine particles, metal fine particles and ceramic fine particles.

3. The method of claim 1, wherein the volume-average particle size of the fine particles is within a range of 0.1 to 500 µm.

4. The method of claim 1, wherein a ratio of a long axial length of the fine particles to a short axial length of the fine particles is within a range of 1:1 to 50:1.

5. The method of claim 1, wherein the specific gravity of the fine particles is within a range of 1.05 to 12.00 times that of the liquid medium.

6. The method of claim 1, wherein the content of the fine particles in the fine particle dispersion is within a range of 0.1 to 60% by volume.

7. The method of claim 1, wherein an angle of the microflow-channel extending from the inlet section to the discharge section is within a range of 0° to 30° relative to the gravitational direction.

8. The method of claim 1, wherein an angle of the microflow-channel extending from the inlet section to the discharge section is within a range of 0° to 15° relative to the gravitational direction.

9. A method for delivering a fine particle dispersion to minimize stagnation, deposition or clogging, comprising:
    using a microflow-channel comprising an inlet section, a discharge section, and comprising at least one portion at which the cross-sectional diameter of the microflow-channel changes;
    arranging the microflow-channel such that the discharge section is positioned below the inlet section in the gravitational direction;
    setting an angle of the-wall surfaces of the microflow-channel extending from the inlet section to the discharge section within a range of 0° to 45° relative to the gravitational direction; and
    introducing a fine particle dispersion into the inlet section and delivering the introduced fine particle dispersion to the discharge section by a liquid medium in a laminar flow state;
    wherein the fine particle dispersion comprises fine particles which are dispersed in the liquid medium, the fine particles having a volume-average particle size within a range of 0.1 to 1000 µm and a specific gravity of the fine particles is within a range of 1.01 to 21.00 times that of the liquid medium such that stagnation, deposition or clogging is minimized.

10. The method of claim 9, wherein the fine particles are selected from resin fine particles, inorganic fine particles, metal fine particles and ceramic fine particles.

11. The method of claim 9, wherein the specific gravity of the fine particles is within a range of 1.05 to 12.00 times that of the liquid medium.

12. The method of claim 9, wherein the angle of the wall surfaces of the at least one portion at which the cross-sectional diameter of the microflow-channel changes is within a range of 0° to 30° relative to the gravitational direction.

13. The method of claim 9, wherein the angle of the wall surfaces of the at least one portion at which the cross-sectional diameter of the microflow-channel changes is within a range of 0° to 15° relative to the gravitational direction.

14. The method of claim 9, wherein the volume-average particle size of the fine particles is within a range of 0.1 to 500 µm.

15. A device for delivering a fine particle dispersion which minimizes stagnation, deposition or clogging, comprising:
    a microflow-channel having an inlet section and a discharge section,
    wherein the microflow-channel is arranged such that the discharge section is positioned below the inlet section in the gravitational direction, and an angle of the microflow-channel extending from the inlet section to the discharge section is set within a range of 0° to 45° relative to the gravitational direction, and
    wherein the fine particle dispersion comprises fine particles which are dispersed in a liquid medium, the fine particles having a volume-average particle size within a range of 0.1 to 1000 µm and a specific gravity of the fine particles within a range of 1.01 to 21.00 times that of the liquid medium, and the fine particle dispersion is delivered from the inlet section to the discharge section by the liquid medium flowing in a laminar flow state such that stagnation, deposition or clogging is minimized.

16. The device according to claim 15, wherein an angle of the microflow-channel extending from the inlet section to the discharge section is within a range of 0° to 30° relative to the gravitational direction.

17. The device according to claim 15, wherein an angle of the microflow-channel extending from the inlet section to the discharge section is within a range of 0° to 15° relative to the gravitational direction.

18. A device for delivering a fine particle dispersion which minimizes stagnation, deposition or clogging, comprising:
a microflow-channel having an inlet section;
a discharge section; and
at least one portion at which the cross-sectional diameter of the microflow-channel changes,
wherein the microflow-channel is arranged such that the discharge section is positioned below the inlet section in the gravitational direction, and an angle of the wall surfaces of the microflow-channel extending from the inlet section to the discharge section is set within a range of 0° to 45° relative to the gravitational direction, and
wherein the fine particle dispersion comprises fine particles which are dispersed in a liquid, the fine particles having a volume-average particle size within a range of 0.1 to 1000 μm and a specific gravity of the fine particles is within a range of 1.01 to 21.00 times that of the liquid medium, and the fine particle dispersion is delivered from the inlet section to the discharge section by the liquid medium flowing in a laminar flow state such that stagnation, deposition or clogging is minimized.

19. The device according to claim 18, wherein an angle of the wall surfaces of the at least one portion at which the cross-sectional diameter of the microflow-channel changes is within a range of 0° to 30° relative to the gravitational direction.

20. The device according to claim 18, wherein an angle of the wall surfaces of the at least one portion at which the cross-sectional diameter of the microflow-channel changes is within the range of 0° to 15° relative to the gravitational direction.

* * * * *